US012237560B2

(12) United States Patent
Wang

(10) Patent No.: US 12,237,560 B2
(45) Date of Patent: Feb. 25, 2025

(54) DUAL-BAND DUAL-POLARIZATION SPLITTER

(71) Applicants: PROSE TECHNOLOGIES (SUZHOU) CO., LTD, Suzhou (CN); PROSE TECHNOLOGIES LLC, Mount Olive, NJ (US)

(72) Inventor: Lei Wang, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 254 days.

(21) Appl. No.: 17/838,136

(22) Filed: Jun. 10, 2022

(65) Prior Publication Data

US 2022/0384929 A1 Dec. 1, 2022

Related U.S. Application Data

(63) Continuation of application No. PCT/CN2019/127500, filed on Dec. 23, 2019.

(51) Int. Cl.
*H01P 5/20* (2006.01)
*H01P 1/161* (2006.01)
(Continued)

(52) U.S. Cl.
CPC ................ *H01P 5/20* (2013.01); *H01P 1/161* (2013.01); *H01P 1/165* (2013.01); *H01P 3/06* (2013.01)

(58) Field of Classification Search
CPC .... H01P 3/06; H01P 5/16; H01P 1/165; H01P 5/20; H01P 1/161
See application file for complete search history.

(56) References Cited

U.S. PATENT DOCUMENTS 11,031,692 B1 * 6/2021 Hu ..................... H01Q 13/0275
2010/0007432 A1 * 1/2010 Uher ....................... H01P 1/161 333/132
(Continued)

FOREIGN PATENT DOCUMENTS

CN 204067545 U 12/2014
CN 107959098 A 4/2018
(Continued)

OTHER PUBLICATIONS

The World Intellectual Property Organization (WIPO) International Search Report for PCT/CN2019/127500 Aug. 31, 2020 4 Pages (including translation).

*Primary Examiner* — Quan Tra
(74) *Attorney, Agent, or Firm* — ANOVA LAW GROUP, PLLC

(57) ABSTRACT

The present disclosure provides a dual-band dual-polarization splitter connecting a cross-shaped waveguide power divider to with an E-plane waveguide magic T and an ortho-mode transition through an E/H-plane 90° curved waveguide to form a new type of coaxial waveguide ortho-mode transition, thereby implementing the structure of coaxial circular waveguide feeding in high and low frequencies at the same time, reducing the length of the high-frequency transmission line, and reducing the transmission loss. Meanwhile, the present disclosure implements dual-polarization transmission in each frequency band, and can flexibly switch between vertical polarization and horizontal polarization when the dual-polarization has been converted to the single-polarization.

20 Claims, 6 Drawing Sheets

(51) Int. Cl.
*H01P 1/165* (2006.01)
*H01P 3/06* (2006.01)

(56) References Cited

U.S. PATENT DOCUMENTS

| | | | | |
|---|---|---|---|---|
| 2013/0088307 | A1* | 4/2013 | Dousset | H01P 1/161 333/137 |
| 2014/0159977 | A1 | 6/2014 | Jones | |
| 2014/0266934 | A1* | 9/2014 | Cook | H01Q 13/0208 343/720 |
| 2021/0242587 | A1* | 8/2021 | Letestu | H01Q 5/50 |

FOREIGN PATENT DOCUMENTS

| | | | | |
|---|---|---|---|---|
| CN | 108123200 | A | 6/2018 | |
| CN | 207517837 | U * | 6/2018 | H01P 1/16 |
| CN | 115064856 | A * | 9/2022 | |
| JP | 11017402 | A * | 1/1999 | H01P 1/161 |

* cited by examiner

DUAL-BAND DUAL-POLARIZATION SPLITTER

CROSS-REFERENCE TO RELATED APPLICATION

This application is a continuation application of PCT application PCT/CN2019/127500, filed on Dec. 23, 2019, the entire content of which is incorporated herein by reference.

FIELD OF THE DISCLOSURE

The present disclosure relates to the technical field of wireless communication, and, more specifically, to a dual-band dual-polarization splitter.

BACKGROUND

Transceiving sharing technology has been widely used in the fields of navigation measurement and control, satellite communication, etc., and with the increase of satellite spectrum resources, an antenna used in two or more frequency bands can be implemented by the dual-band sharing or multi-band sharing antenna with only a small increase in cost, especially when the antenna aperture is large, this method can significantly reduce the cost of the antenna system, reduce the land use area, and facilitate the deployment of user sites.

In addition, with the increasing maturity of electromagnetic simulation software and the development of the coaxial turnstile coupler technology, the available bandwidth of the coupling waveguide port of the coaxial turnstile coupler is getting wider and wider, which can meet the bandwidth requirements of dual-band usage. In addition, because the coaxial inner conductor of the coaxial turnstile coupler is hollow, a circular waveguide can be formed for transmitting signals of higher frequency bands, does not need to be debugged and the structure thereof is simple.

Chinese Patent Application No. CN201711361522.4 discloses a coaxial waveguide ortho-mode coupler matched with a truncated cone, as shown in FIG. 1, including a coaxial turnstile joint 1, a first U-shaped curved waveguide element 2, a second U-shaped curved waveguide element 3, a third U-shaped curved waveguide element 4, a fourth U-shaped curved waveguide element 5, and a first power combiner/distributor 6, and a second power combiner/distributor 7.

However, in the above-mentioned document, due to the cross-cavity design, the structural layout is not convenient for product realization, for example, the high-frequency signal from the coaxial turnstile joint 1 is blocked by the waveguide cavity surrounded by four U-shaped curved waveguide elements and cannot be transmitted, and the processing of product parts is also not convenient to be achieved, the intersection of the waveguide cavities in the above document is not easy to achieve during the processing of the parts; in addition, the electrical functions are not flexible enough to achieve the flexible switching between single-polarization mode and dual-polarization mode, such as signals from power combiner/divider 6, 7 are in a single polarization mode.

SUMMARY

One aspect of the present disclosure provides a dual-band dual-polarization splitter, including a coaxial circular waveguide, a cross-shaped waveguide power divider, a first waveguide magic T, a second waveguide magic T and an ortho-mode transition. The coaxial circular waveguide is located on a central axis of the cross-shaped waveguide power divider and is perpendicular to a top surface of the cross-shaped waveguide power divider, the coaxial circular waveguide includes an outer circular waveguide and an inner circular waveguide located in the outer circular waveguide. A cross-shaped waveguide cavity is formed in the cross-shaped waveguide power divider, the cross-shaped waveguide cavity is in communication with the outer circular waveguide. The inner circular waveguide penetrates through the cross-shaped waveguide power divider, and is configured to a high-frequency signal. The cross-shaped waveguide power divider has four signal channels connected to the cross-shaped waveguide cavity, and the four signal channels are distributed in a cross shape. Two of the signal channels respectively located in a first direction are in communication with two input ports of the first waveguide magic T, and the other two of the signal channels respectively located in a second direction perpendicular to the first direction are in communication with two input ports of the second waveguide magic T. An output port of the first waveguide magic T and an output port of the second waveguide magic T are both in communication with input ports of the ortho-mode transition. An output port of the ortho-mode transition forms a circular waveguide interface.

In some embodiments, the first waveguide magic T is a first E-plane waveguide magic T, and the second waveguide magic T is a second E-plane waveguide magic T; or the first waveguide magic T is a first H-plane waveguide magic T, and the second waveguide magic T is a second H-plane waveguide magic T.

In some embodiments, a polarization converter is arranged between the second E-plane waveguide magic T and the ortho-mode transition.

In some embodiments, the first waveguide magic T and the second waveguide magic T are located on the same plane, and do not intersect with each other.

In some embodiments, the splitter further comprises a plurality of 90° curved waveguides, and one of the signal channels of the cross-shaped waveguide power divider are in communication with an input port of corresponding waveguide magic T through one of the 90° curved waveguides.

In some embodiments, the one of 90° curved waveguides includes an E-plane 90° waveguide and an H-plane 90° curved waveguide, and a first end of the E-plane 90° waveguide is in communication with the one of the signal channel of the cross-shaped waveguide power divider, a second end of the E-plane 90° waveguide is in communication with a first end of the H-plane 90° curved waveguide, and a second end of the H-plane 90° curved waveguide is in communication with the input port of the corresponding waveguide magic T.

In some embodiments, the dual-band dual-polarization splitter further includes a circular waveguide, and the circular waveguide is in communication with the circular waveguide interface.

In some embodiments, the outer circular waveguide transmits only the TEM mode and the TE11 mode, and cutoff other high-order mode.

Another aspect of the present disclosure provides a dual-band dual-polarization splitter, including an upper structure, a lower structure, a middle structure between the upper structure and the lower structure, and a cylindrical tube penetrating through the upper structure, the middle structure and the lower structures. The upper structure includes an upper end surface and a lower end surface opposite to each other, a cross-shaped waveguide cavity is formed on the lower end surface of the upper structure, and a circular hole penetrating through the upper end surface and the lower end surface of the upper structure is arranged in a center of the cross-shaped waveguide cavity, the cylindrical tube passes through the circular hole; The middle structure is provided with four through-holes corresponding to the cross-shaped waveguide cavity and distributed in a cross shape, each of four output ports of the cross-shaped waveguide cavity is in communication with one of the through-holes correspondingly, and the through-holes penetrate through the middle structure; A first waveguide magic T, a second waveguide magic T, and an ortho-mode transition are formed between a lower end surface of the middle structure and an upper end surface of the lower structure, two input ports of the first waveguide magic T respectively are in communication with two of the through-holes located on the middle structure in a first direction, and two input ports of the second waveguide magic T respectively are in communication with the other two of the through-holes located on the middle structure in a second direction perpendicular to the first direction; An output port of the first waveguide magic T and an output port of the second waveguide magic T are both in communication with input ports of the ortho-mode transition. An output port of the ortho-mode transition forms a circular waveguide interface.

In some embodiments, an upper end surface of the middle structure is further provided with a first step corresponding to the cross-shaped waveguide cavity, and an end surface of the first step is in a cross shape, and the first step is connected to an outer wall of the cylindrical tube.

In some embodiments, ends of the cross-shaped waveguide cavity corresponding to the four through-holes are each provided with a second step.

In some embodiments, a quantity of steps included in the second step is 2 to 4.

In some embodiments, a polarization converter is formed between the lower end surface of the middle structure and the upper end surface of the lower structure, and the polarization converter is arranged between the second waveguide magic T and the ortho-mode transition.

The beneficial effects of the present disclosure are as follows:

1. The present disclosure uses a cross-shaped power divider to cleverly connect the E-plane waveguide magic T and the ortho-mode coupler through an E/H-plane 90° curved waveguide to form a new type of coaxial waveguide ortho-mode coupler, thereby implementing the structure of coaxial circular waveguide feeding in high and low frequencies (i.e., double frequencies) at the same time, reducing the length of the high frequency transmission line and reducing the transmission loss. Meanwhile, the present disclosure realizes dual-polarization transmission in each frequency band, and can flexibly switch between vertical polarization and horizontal polarization when dual-polarization has been converted to single-polarization.

2. The cross-shaped power divider of the present disclosure adopts a step structure, which can effectively improve the working bandwidth, the flatness of the power divide, and the isolation among ports.

3. The structure of the present disclosure is simple and compact, which is convenient for miniaturization of products and batch processing products.

REFERENCE NUMERALS

Figure 1:
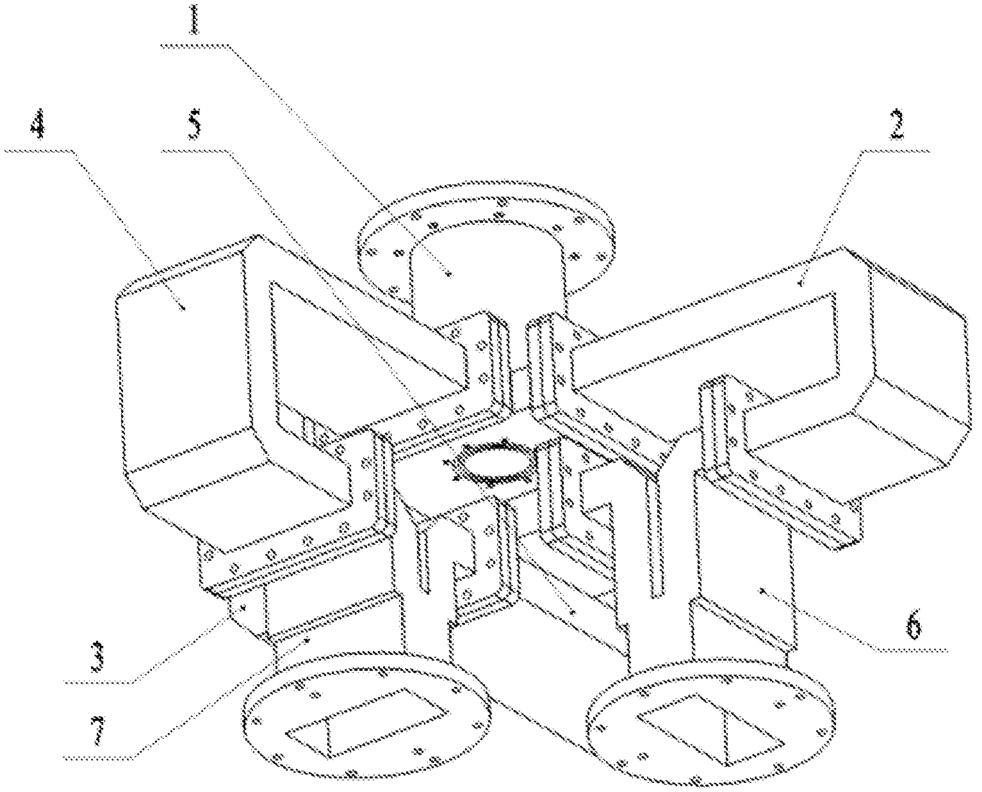
Fig 1 (Prior Art)
FIG. 1 is a structural view of an existing coaxial waveguide ortho-mode coupler.
Figure 2:
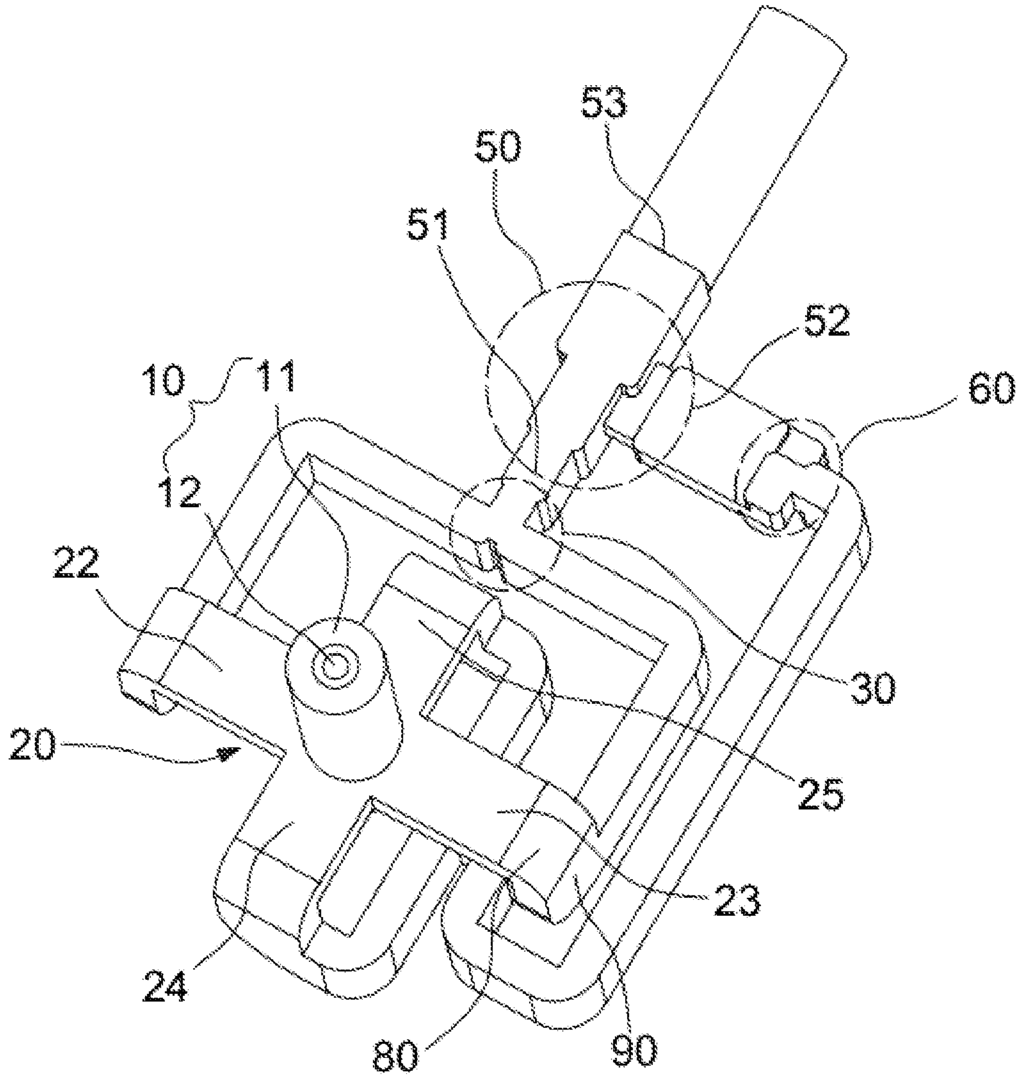
FIG. 2 is a perspective structural view of a dual-band dual-polarization splitter according to an example embodiment of the present disclosure.
Figure 3:
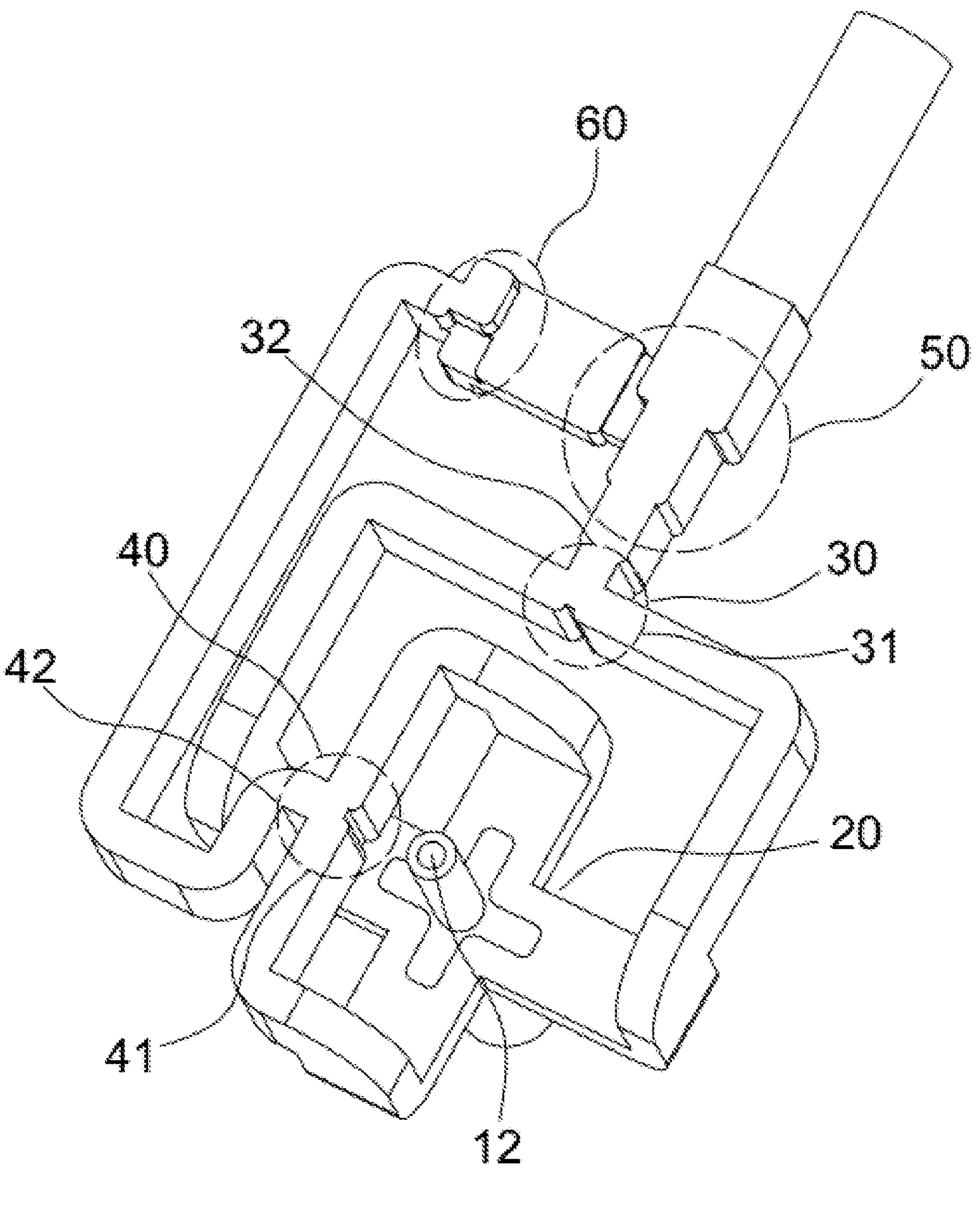
FIGS. 3 and 4 are perspective structural views of the splitter shown in FIG. 2 from other two perspectives.
Figure 4:
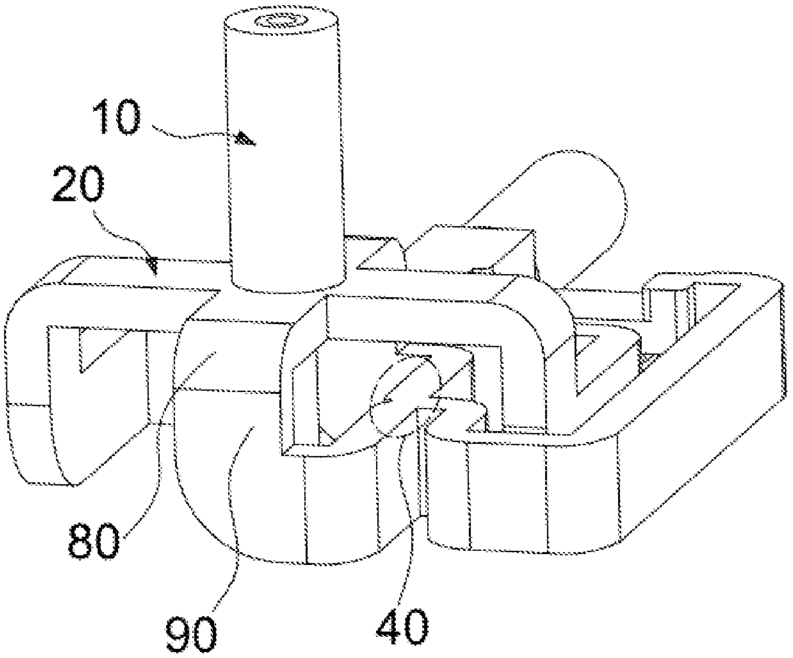

10 coaxial circular waveguide, 11 outer circular waveguide, 12 inner circular waveguide, 20 cross-shaped waveguide power divider, 21 cross-shaped waveguide cavity, 22 front signal channel, 23 rear signal channel, 24 left signal channel, 25 right signal channel, 26 first step, 30 first E-plane waveguide magic T, 31 input port, 32 output port, 40 second E-plane waveguide magic T, 41 input port, 42 output port, 50 ortho-mode transition, 51/52 rectangular waveguide port, 53 circular waveguide interface, 60 polarization converter, 70 circular waveguide, 80 E-plane 90° waveguide, 90 H-plane 90° curved waveguide, 100 upper structure, 101 first upper end surface, 102 first lower end surface, 103 round hole, 104 second step, 200 middle structure, 201 second upper end surface, 202 second lower end surface, 203 cylindrical tube, 204 through-hole, 205 first low-frequency waveguide cavity, 206 second low-frequency waveguide cavity, 207 ortho-mode transition cavity, 208 polarization conversion cavity, 209 circular waveguide half hole, 300 lower structure, 301 third upper end surface.

DETAILED DESCRIPTION

The technical solutions of the embodiments of the present disclosure will be clearly and completely described below in conjunction with the accompanying drawings of the present disclosure.

With reference to FIGS. 2-7, a dual-band dual-polarization splitter according to some embodiments of the present disclosure includes a coaxial circular waveguide 10, a cross-shaped waveguide power divider 20, a first E-plane waveguide magic T 30, a second E-plane waveguide magic T 40, an ortho-mode transition 50, a polarization converter 60 and a circular waveguide 70, wherein the coaxial circular waveguide 10 is located on the central axis of the cross-shaped waveguide power divider 20, which is coaxial with the cross-shaped waveguide power divider 20 and perpendicular to the top surface of the cross-shaped waveguide power divider 20. A waveguide magic T, as used herein, may also be referred to as a hybrid waveguide Tee.

The coaxial circular waveguide 10 includes an outer circular waveguide 11 and an inner circular waveguide 12 arranged coaxially, the inner circular waveguide 12 is located in the outer circular waveguide 11 and penetrates through the top and bottom surfaces of the cross-shaped waveguide power divider 20, that is, the lower end of the inner circular waveguide 12 penetrates through the bottom surface of the cross-shaped waveguide power divider 20, an end (such as the lower end) of the inner circular waveguide 12 is connected to a high-frequency transmitter (not shown), and the other end (such as the top end) of the inner circular waveguide 12 is connected to the antenna reflection surface (not shown) to transmit high-frequency signals to the antenna reflection surface. Among them, the ratio of the inner diameter of the outer circular waveguide 11 to the outer diameter of the inner circular waveguide 12 satisfies to transmit only the TEM mode and the TE11 mode and cutoff other high-order mode.

A cross-shaped waveguide cavity 21 is formed in the cross-shaped waveguide power divider 20, and the outer circular waveguide 11 of the coaxial circular waveguide is in communication with the cross-shaped waveguide cavity 21. The cross-shaped waveguide power divider 20 has four signal channels distributed in a cross shape, the four signal channels are formed by extending forward, back, left, and right from the outer edge of the cross-shaped waveguide cavity 21 separately, and the four signal channels are all in communication with the cross-shaped waveguide cavity 21. For ease of description, the four signal channels are defined as a front signal channel 22, a rear signal channel 23, a left signal channel 24, and a right signal channel 25, wherein the front signal channel 22 and the rear signal channel 23 are located in the same direction (defined as a first direction), the left signal channel 24 and the right signal channel 25 are located in the same direction (defined as a second direction perpendicular to the first direction).

The front signal channel 22 and the rear signal channel 23 are respectively in communication with two input ports 31 of the first E-plane waveguide magic T 30, and the output port 32 of the first E-plane waveguide magic T 30 is in communication with the rectangular waveguide port 51 of the ortho-mode transition 50 to merge the front and back signal channels 22, 23 into one channel.

The left signal channel 24 and the right signal channel 25 are respectively in communication with two input ports 41 of the second E-plane waveguide magic T 40, and the output port 42 of the second E-plane waveguide magic T 40 is in communication with another rectangular waveguide port 52 of the ortho-mode transition 50 to merge the left and right signal channels 24, 25 into one channel. In some embodiments, the first E-plane waveguide T 30 and the second E-plane waveguide T 40 are located on the same plane, and they do not intersect with each other.

During implementation, the two input ports 31 of the first E-plane waveguide magic T 30 are connect with the front signal channel 22 and the rear signal channel 23 by a 90° curved waveguide, and the two input ports 41 of the second E-plane waveguide magic T 40 are connected with the left signal channel 24 and the right signal channel 25 by a 90° curved waveguide. In the present embodiment 1, the four signal channels and the input ports of the corresponding E-plane waveguide magics T are all connected by E-plane 90° waveguides 80 and H-plane 90° curved waveguides 90. Specifically, the front signal channel 22 is in communication with one end of the E-plane 90° waveguide 80, the other end of the E-plane 90° waveguide 80 is in communication with one end of the H-plane 90° curved waveguide 90, and the other end of the H-plane 90° curved waveguide 90 is in communication with the input port 31 of the first E-plane waveguide magic T 30. The rear signal channel 23 is in communication with one end of the E-plane 90° waveguide, the other end of the E-plane 90° waveguide 80 is in communication with one end of the H-plane 90° curved waveguide 90, and the other end of the H-plane 90° curved waveguide 90 is in communication with the other input port 31 of the first E-plane waveguide magic T 30.

Similarly, the left signal channel 24 is in communication with one end of the E-plane 90° waveguide 80, the other end of the E-plane 90° waveguide 80 is in communication with one end of the H-plane 90° curved waveguide 90, and the other end of the H-plane 90° curved waveguide 90 is in communication with the input port 41 of the second E-plane waveguide magic T 40. The right signal channel 25 is in communication with one end of the E-plane 90° waveguide 80, the other end of the E-plane 90° waveguide 80 is in communication with one end of the H-plane 90° curved waveguide 90, and the other end of the H-plane 90° curved waveguide 90 is in communication with the other input port 41 of the two E-plane waveguide magic T 40.

In this way, the four signal channels are merged into two signal channels after passing through the first E-plane waveguide magic T 30 and the second E-plane waveguide magic T 40. The two signal channels are respectively connected to the two rectangular waveguide ports 51 of the ortho-mode transition 50, and finally the two signal channels are merged into a circular waveguide interface 53 used to be in communication with the circular waveguide 70. During implementation, the circular waveguide 70 is connected to a low-frequency transmitter for transmitting low-frequency signals, and the circular waveguide 70 has both horizontal polarization and vertical polarization.

As an alternative, the above-mentioned first E-plane waveguide magic T 30 and the second E-plane waveguide magic T 40 can also be replaced by the H-plane waveguide magic T, and the structure of the entire waveguide cavity needs to be modified.

In some embodiments, a polarization converter can be added between a channel before being merged and the ortho-mode transition 50. Specifically, in the present embodiment 1, a polarization converter 60 is arranged between the output port 42 of the second E-plane waveguide magic T 40 and the ortho-mode transition 50 to reduce the complexity of the structure layout and facilitate the structural design of the product shape.

The working principle of the present disclosure is: the high-frequency signal can be directly transmitted through the inner circular waveguide 12 and have both vertical and horizontal polarizations, and the low-frequency signal passes through the inner wall of the outer circular waveguide 11 and then is distributed into the signals in the four directions, front, back, left, and right by the cross-shaped waveguide power divider 20, the signals distributed in the four directions are merged into two polarization orthogonal signals through two E-plane waveguide magics T 30, 40, and the two orthogonal signals can be merged into one signal through the ortho-mode transition 50 and can transmit both vertical and horizontal polarizations at the same time.

The present disclosure effectively solves the structural interference problem of coaxial circular waveguide performing high-frequency feeding and low-frequency feeding simultaneously, and reduces the length of the high-frequency transmission line and the transmission loss by the above-mentioned structural design of dividing and then merging the low frequency signal, and the clever connection layout of different types of curved waveguides. The present disclosure also realizes dual-polarization transmission in each frequency band, and can flexibly switch between vertical polarization and horizontal polarization when dual-polarization has been converted to single-polarization.

Figure 5:
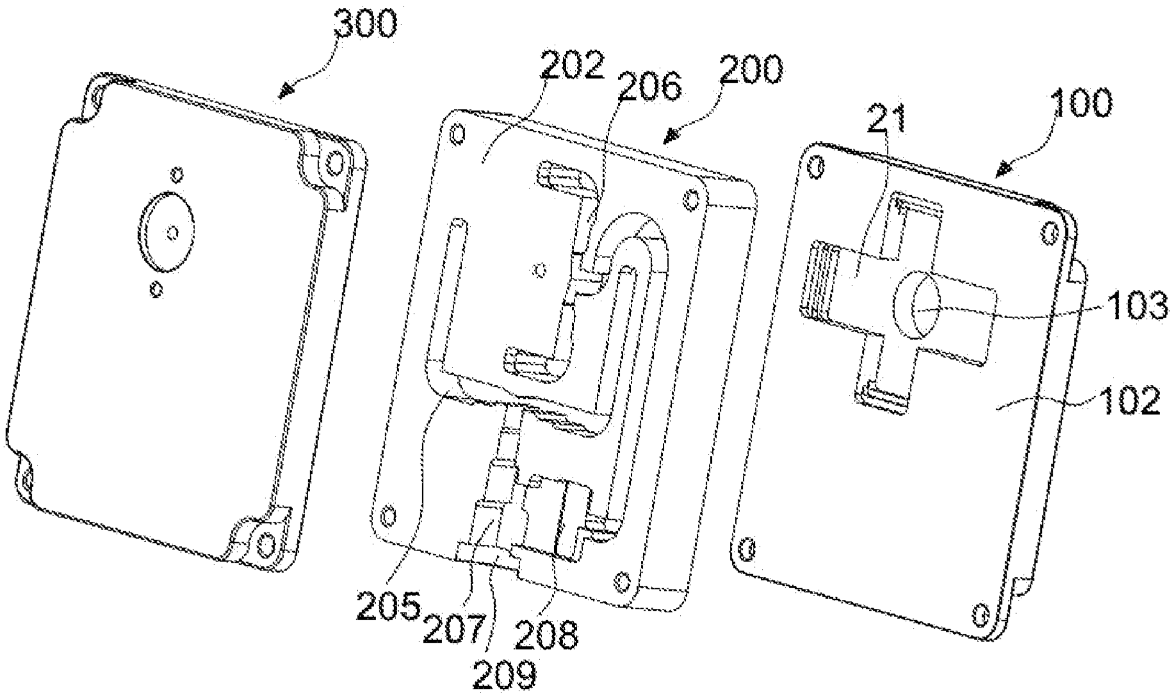
FIG. 5 is an exploded structural view of a dual-band dual-polarization splitter according to an example embodiment of the present disclosure.
Figure 6:
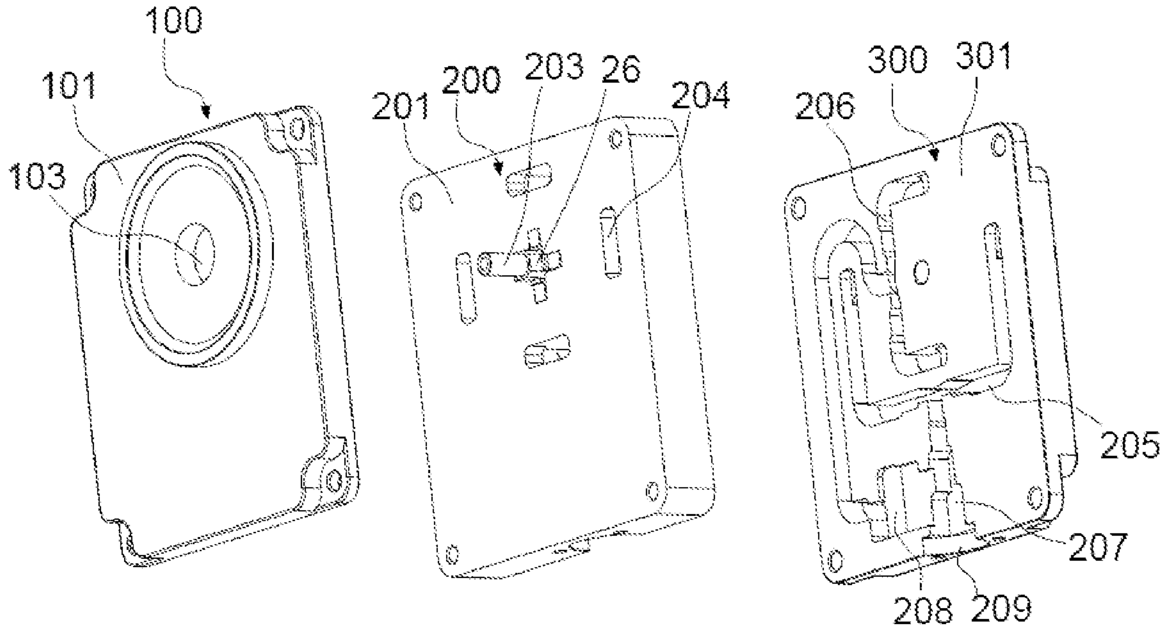
FIG. 6 is an exploded structural view of the splitter shown in FIG. 5 of the present disclosure from another perspective.
Figure 7:
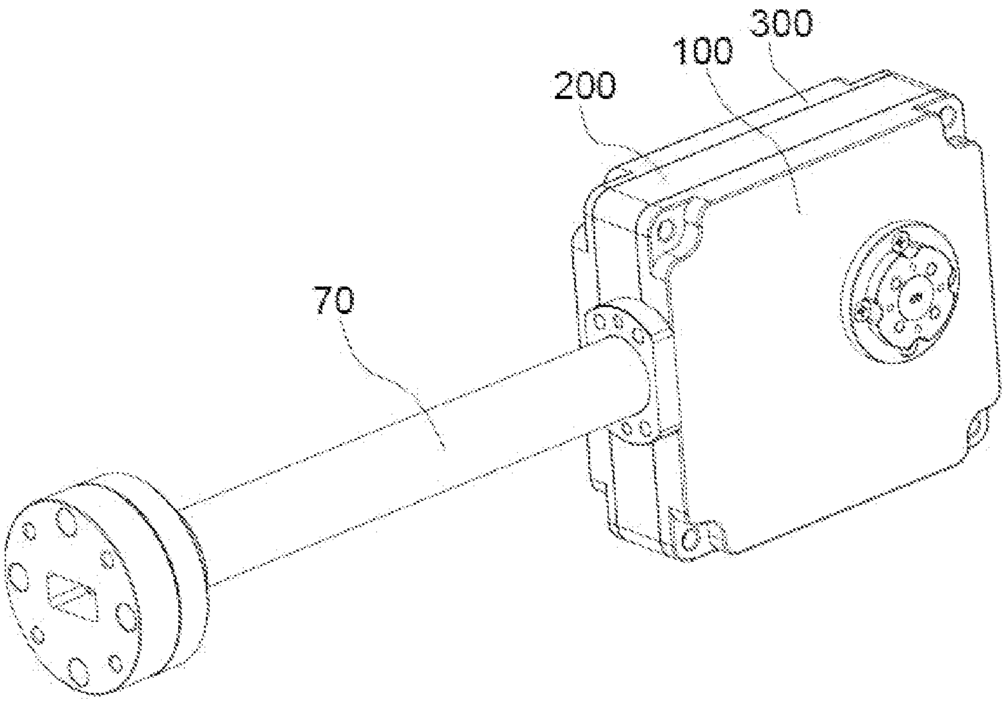
FIG. 7 is a structural view of a dual-band dual-polarization splitter according to an example embodiment of the present disclosure after assembly.

FIGS. 5-7 are structural views of a dual-band dual-polarization splitter according to an example embodiment of the present disclosure, specifically, the product includes an upper structure 100, a lower structure 300, and a middle structure 200 located between the upper structure 100 and the lower structure 300, wherein the upper structure 100 includes a first upper end surface 101 and a first lower end surface 102 opposite to each other, a cross-shaped waveguide cavity 21 is formed on the first lower end surface 102, the cross-shaped waveguide cavity 21 is recessed from the first lower end surface 102 toward the first upper end surface 101, a circular hole 103 is provided at the center of the cross-shaped waveguide cavity 21, and the circular hole 103 penetrates through the first upper end surface 101 and the first lower end surface 102 of the upper structure 100.

The middle structure 200 has a second upper end surface 201 and a second lower end surface 202 opposite to each other, wherein the second upper end surface 201 is the end surface close to the first lower end surface 102 of the upper structure 100. A cylindrical tube 203 is fixed on the second upper end surface 201, the cylindrical tube 203 is perpendicular to the second upper end surface 201 of the middle structure 200, and the cylindrical tube 203 extends upward to the first upper end surface 101 of the upper structure 100 through the circular hole 103 of the upper structure 100, the cylindrical tube 203 is coaxial with the circular hole 103, so that the cylindrical tube 203 and the circular hole 103 form a inner circular waveguide 12 and an outer circular waveguide 11 coaxially. And the cylindrical tube 203 also penetrates through the lower structure 300, that is, the cylindrical tube 203 penetrates through the upper structure 100, the middle structure 200 and the lower structure 300.

In some embodiments, a first step 26 is further provided on the second upper end surface 201 of the middle structure 200, an end surface of the first step 26 corresponding to the cross-shaped waveguide cavity 21 is in a cross shape, and the distribution direction of the cross shape is the same as that of the cross-shaped waveguide cavity 21, the cylindrical tube 203 is located at the center of the first step 26, and the first step 26 is connected to the outer wall of the cylindrical tube 203. The first step 26 is used to optimize the impedance matching of the four ports of the cross-shaped waveguide power divider 20 to increase the working bandwidth.

In addition, a through-hole 204 penetrating through the middle structure 200 is provided at a certain distance from the ends of the first step 26, the first step 26 has four ends, correspondingly, four through-holes 206 are formed, the four through-holes 206 are in communication with the cross-shaped waveguide cavity 21, specifically, the four output ports of the cross-shaped waveguide cavity 21 respectively.

In some embodiments, the four ends of the cross-shaped waveguide cavity 21 corresponding to the four through-holes 204 are each provided with a second step 104, and the step extension direction of the second step 104 is from the bottom of the cross-shaped waveguide cavity 21 to the first lower end surface 102 of the upper structure 100, the step level number of the second step 104 is usually 2 to 4. The arrangement of the second step 104 facilitates the transition of the signal from the cross-shaped waveguide cavity 21 to the corresponding through-hole 204.

The second lower end surface 202 of the middle structure 200 and the third upper end surface 301 of the lower structure 300 are each provided with a half of the first low-frequency waveguide cavity 205, a half of the second low-frequency waveguide cavity 206, and a half of the ortho-mode conversion cavity 207 in corresponding positions. As such, after the middle structure 200 and the lower structure 300 are bonded together, the first low-frequency waveguide cavities 205 on the middle structure 200 and the lower structure 300 are combined to form the first E-plane waveguide magic T 30, and the second low-frequency waveguide cavities 206 on the middle structure 200 and the lower structure 300 are combined to form the second E-plane waveguide magic T 40, and the ortho-mode conversion cavities 207 on the middle structure 200 and the lower structure 300 are combined to form the ortho-mode transition 50, wherein two input ports 31 of the first E-plane waveguide magic T 30 are respectively in communication with the two through-holes 204 located on the middle structure 200 in the first direction, and the two input ports 41 of the second E-plane waveguide magic T 40 are respectively in communication with the another two through-holes 204 located on the middle structure 200 in the second direction perpendicular to the first direction.

The output port 32 of the first E-plane waveguide magic T 30 and the output port 42 of the second E-plane waveguide magic T 40 are both in communication with the ortho-mode transition 50.

In some embodiments, the second lower end surface 202 of the middle structure 200 and the third upper end surface 301 of the lower structure 300 are each provided with a half of the polarization conversion cavity 208 in corresponding positions, and the polarization conversion cavity 208 is arranged between the second low-frequency waveguide cavity 206 and the ortho-mode conversion cavity 207, after the middle structure 200 and the lower structure 300 are bonded together, the polarization conversion cavities 208 on the middle structure 200 and the lower structure 300 are combined to form the polarization converter 60. As such, the formed polarization converter 60 is arranged between the second E-plane waveguide T 40 and the ortho-mode transition 50.

The second lower end surface 202 of the middle structure 200 and the third upper end surface 301 of the lower structure 300 are each provided with circular waveguide half hole 209 in corresponding positions, and the circular waveguide half holes 209 are in communication with the ortho-mode conversion cavity 207, as such, after the middle structure 200 and the lower structure 300 are bonded together, the circular waveguide half-holes 209 on the middle structure 200 and the lower structure 300 are combined to form a circular waveguide interface 53 used to connect to the circular waveguide 70, and the circular waveguide interface 53 is formed at the output port of the ortho-mode transition 50.

The technical content and technical features of the present disclosure have been disclosed as above, but those skilled in the art may still make various substitutions and modifications based on the teaching and disclosure of the present disclosure without departing from the spirit of the present disclosure, therefore, the protection scope of the present disclosure should not be limited to the disclosure in the embodiments, but should include various substitutions and modifications without departing from the present disclosure, and are covered by the claims of this patent application.

The invention claimed is:

1. A dual-band dual-polarization splitter, comprising:

a coaxial circular waveguide, a cross-shaped waveguide power divider, a first waveguide magic T, a second waveguide magic T and an ortho-mode transition, wherein:

the coaxial circular waveguide is located on a central axis of the cross-shaped waveguide power divider and is perpendicular to a top surface of the cross-shaped waveguide power divider, the coaxial circular waveguide includes an outer circular waveguide and an inner circular waveguide located in the outer circular waveguide;

a cross-shaped waveguide cavity is formed in the cross-shaped waveguide power divider, the cross-shaped waveguide cavity is in communication with the outer circular waveguide;

the inner circular waveguide penetrates through the cross-shaped waveguide power divider, and is configured to transmit a high-frequency signal;

the cross-shaped waveguide power divider has four signal channels connected to the cross-shaped waveguide cavity, and the four signal channels are distributed in a cross shape, wherein two of the signal channels respectively located in a first direction are in communication with two input ports of the first waveguide magic T, and the other two of the signal channels respectively located in a second direction perpendicular to the first direction are in communication with two input ports of the second waveguide magic T;

an output port of the first waveguide magic T and an output port of the second waveguide magic T are both in communication with input ports of the ortho-mode transition;

the ortho-mode transition is configured to merge two input orthogonal signals into one output signal and transmit both vertical and horizontal polarizations at the same time, the two orthogonal input signals being respectively from the output port of the first waveguide magic T and the output port of the second waveguide magic T; and an output port of the ortho-mode transition forms a circular waveguide interface.

2. The dual-band dual-polarization splitter according to claim 1, wherein the first waveguide magic T is a first E-plane waveguide magic T, and the second waveguide magic T is a second E-plane waveguide magic T.

3. The dual-band dual-polarization splitter according to claim 2, wherein a polarization converter is arranged between the second E-plane waveguide magic T and the ortho-mode transition.

4. The dual-band dual-polarization splitter according to claim 1, wherein the first waveguide magic T is a first H-plane waveguide magic T, and the second waveguide magic T is a second H-plane waveguide magic T.

5. The dual-band dual-polarization splitter according to claim 1, wherein the first waveguide magic T and the second waveguide magic T are located on the same plane, and do not intersect with each other.

6. The dual-band dual-polarization splitter according to claim 2, wherein the first waveguide magic T and the second waveguide magic T are located on the same plane, and do not intersect with each other.

7. The dual-band dual-polarization splitter according to claim 3, wherein the first waveguide magic T and the second waveguide magic T are located on the same plane, and do not intersect with each other.

8. The dual-band dual-polarization splitter according to claim 4, wherein the first waveguide magic T and the second waveguide magic T are located on the same plane, and do not intersect with each other.

9. The dual-band dual-polarization splitter according to claim 1, further comprising:

a plurality of 90° curved waveguides, and one of the signal channels of the cross-shaped waveguide power divider are in communication with an input port of corresponding waveguide magic T through one of the 90° curved waveguides.

10. The dual-band dual-polarization splitter according to claim 9, wherein the one of the 90° curved waveguides includes an E-plane 90° waveguide and an H-plane 90° curved waveguide, and a first end of the E-plane 90° waveguide is in communication with the one of the signal channels of the cross-shaped waveguide power divider, a second end of the E-plane 90° waveguide is in communication with a first end of the H-plane 90° curved waveguide, and a second end of the H-plane 90° curved waveguide is in communication with the input port of the corresponding waveguide magic T.

11. A dual-band dual-polarization splitter, comprising: an upper structure, a lower structure, a middle structure between the upper structure and the lower structure, and a cylindrical tube penetrating through the upper structure, the middle structure and the lower structures, wherein:

the upper structure includes an upper end surface and a lower end surface opposite to each other, a cross-shaped waveguide cavity is formed on the lower end surface of the upper structure, and a circular hole penetrating through the upper end surface and the lower end surface of the upper structure is arranged in a center of the cross-shaped waveguide cavity, the cylindrical tube passes through the circular hole;

the middle structure is provided with four through-holes corresponding to the cross-shaped waveguide cavity and distributed in a cross shape, each of four output ports of the cross-shaped waveguide cavity is in communication with one of the through-holes correspondingly, and the through-holes penetrate through the middle structure;

a first waveguide magic T, a second waveguide magic T, and an ortho-mode transition are formed between a lower end surface of the middle structure and an upper end surface of the lower structure, two input ports of the first waveguide magic T respectively are in communication with two of the through-holes located on the middle structure in a first direction, and two input ports of the second waveguide magic T respectively are in communication with the other two of the through-holes located on the middle structure in a second direction perpendicular to the first direction;

an output port of the first waveguide magic T and an output port of the second waveguide magic T are both in communication with input ports of the ortho-mode transition;

an output port of the ortho-mode transition forms a circular waveguide interface.

12. The dual-band dual-polarization splitter according to claim 11, wherein an upper end surface of the middle structure is further provided with a first step corresponding to the cross-shaped waveguide cavity, and an end surface of the first step is in a cross shape, and the first step is connected to an outer wall of the cylindrical tube.

13. The dual-band dual-polarization splitter according to claim 11, wherein ends of the cross-shaped waveguide cavity corresponding to the four through-holes are each provided with a second step.

14. The dual-band dual-polarization splitter according to claim 13, wherein a quantity of steps included in the second step 104 is 2 to 4.

15. The dual-band dual-polarization splitter according to claim 11, wherein a polarization converter is formed between the lower end surface of the middle structure and the upper end surface of the lower structure, and the polarization converter is arranged between the second waveguide magic T and the ortho-mode transition.

16. The dual-band dual-polarization splitter according to claim 11, wherein the first waveguide magic T is a first E-plane waveguide magic T, and the second waveguide magic T is a second E-plane waveguide magic T.

17. The dual-band dual-polarization splitter according to claim 11, wherein the first waveguide magic T is a first H-plane waveguide magic T, and the second waveguide magic T is a second H-plane waveguide magic T.

18. The dual-band dual-polarization splitter according to claim 11, wherein the first waveguide magic T and the second waveguide magic T are located on the same plane, and do not intersect with each other.

19. The dual-band dual-polarization splitter according to claim 11, further comprising:

a plurality of 90° curved waveguides, and one of the signal channels of the cross-shaped waveguide power divider are in communication with an input port of corresponding waveguide magic T through one of the 90° curved waveguides.

20. The dual-band dual-polarization splitter according to claim 19, wherein the one of the 90° curved waveguides includes an E-plane 90° waveguide and an H-plane 90° curved waveguide, and a first end of the E-plane 90° waveguide is in communication with the one of the signal channels of the cross-shaped waveguide power divider, a second end of the E-plane 90° waveguide is in communication with a first end of the H-plane 90° curved waveguide, and a second end of the H-plane 90° curved waveguide is in communication with the input port of the corresponding waveguide magic T.

* * * * *